United States Patent Office.

ORAZIO LUGO, OF NEW YORK, N. Y.

Letters Patent No. 60,757, dated January 1, 1867.

IMPROVEMENT IN DEODORIZING PETROLEUM.

The Schedule referred to in these Letters Patent and making part of the same.

Be it known that I, ORAZIO LUGO, of the city and county of New York, State of New York, have invented a method of Deodorizing Kentucky, Canada, and other kinds of Petroleum, which thus far, by their offensive smell, have been excluded from the market; and I do hereby declare that the following is an exact description of my *methodus operandi:*

The principle I have applied for this purpose is the truth demonstrated by modern chemistry, that chemical compounds or elements, when applied in their nascent state, (that means at the moment of their formation or production,) will manifest properties, enter in combinations, and produce results impossible to accomplish afterward, when they have been fully formed and separated from their source. Applying this principle to the treatment of different oils of strong offensive odor, I have succeeded in not only deodorizing them, but also changing their black, opaque appearance to a light brown, transparent one.

To enable others skilled in chemical manipulations to understand and apply my invention, I will now describe it in detail.

I take two pounds nitrate of potassa, one-fourth of an ounce chloride of sodium, and half a drachm bichromate of potash, mix them well, and add one pound sulphuric acid; mix again, and as soon as white fumes appear, I turn in two gallons of oil to be deodorized. I mix and blow in through the mixture, and let it deposit. Finally I treat it with hypo-chlorite of soda, and let it settle or filter; the oil will then be clear and almost odorless. It is clear that we have a combined action of the sulphuric, chromic, and hypo-chloric acids on the oil, producing this striking result.

What I therefore claim, and wish to secure by Letters Patent, is—

The use of chromic acid and hypo-chlorite of soda, or their equivalents, for the purpose of deodorizing offensive-smelling kinds of petroleum.

ORAZIO LUGO.

Witnesses:
WM. S. EATON,
CLINTON RICE.